Patented Aug. 16, 1932

1,872,034

UNITED STATES PATENT OFFICE

ERNEST F. GRETHER, OF MIDLAND, MICHIGAN, ASSIGNOR TO THE DOW CHEMICAL COMPANY, OF MIDLAND, MICHIGAN, A CORPORATION OF MICHIGAN

AZO DYE FROM DIPHENYLOXIDE DERIVATIVES

No Drawing.    Application filed February 2, 1931. Serial No. 513,056.

The present invention relates to azo dyes of direct-developed type prepared by coupling a diazotized halogenated amino-diphenyloxide with a hydroxynaphthoic acid arylide.

It is known that azo dyes which are water-insoluble and fast to light and washing may be produced by coupling diazo or tetrazo components into arylides of 2.3-hydroxynaphthoic acid. I have now discovered new and useful dyes of direct-developed type which may be prepared by diazotizing a halogenated amino-diphenyloxide and coupling therewith a suitable hydroxy component of the above mentioned type. Such dyes, which are very fast to light, bleach, and washing, may be represented by the following general formula,

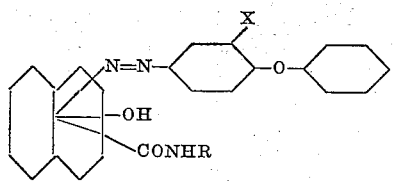

wherein X represents a halo group, and R a residue of a primary aromatic amine.

My invention, then, consists of the steps and new dyes hereinafter fully described and particularly pointed out in the claims, the following description setting forth but several ways in which the principle of the invention may be used.

The herein described azo dyes, which dye cotton and other fibers directly in fast and clear shades, may be prepared by coupling one of the above mentioned amines, such as 4-amino-2-chloro-diphenyloxide or the corresponding bromo compound, into suitable hydroxynaphthoic acid arylides in any of the ordinary ways. For instance, the dyes may be applied by developing on the fiber, by printing a diazo solution upon padded goods, by using nitrosamine salts of the corresponding bases, or may be prepared in substance for use as in pigments. Mordanting or other auxiliary treatment for promoting the absorption of the dye on the fiber, or after-treatment with metallic salts such as chromium, copper, or aluminum salts, for fixing the dye or modifying its color tone, may be optionally employed in conjunction with the dyeing operation, the present invention being intended to include not only the dyes but also material dyed therewith.

The following specific example illustrates various ways in which my invention may be carried out.

Example 1

Cotton fibers were impregnated with an aqueous alkaline solution of 2.3-hydroxynaphthoyl aniline, then rinsed in water and immersed in a dilute aqueous sodium carbonate solution to which had been added a diazo solution prepared from 4-amino-2-chloro-diphenyloxide. The dye developed on the fiber, having a scarlet color and the formula,

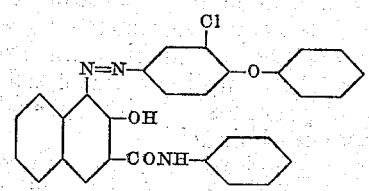

As described in the above example, the same diazo component was coupled into other arylides, as represented in the following table:—

| 2.3-hydroxynaphthoic acid arylide of | Color of dye |
|---|---|
| 3-nitroaniline | Carmine |
| 3.4-dichloroaniline | Castilian red |
| 3-amino-4-methoxy-diphenyl | Castilian red |
| 1-amino-naphthalene | Goya |
| 2-methylaniline | Scarlet |
| 4.4'-diamino-diphenyloxide (di-arylide) | Dark scarlet |

(The Standard Color Chart 8th Ed., 1928, issued by "The Textile Color Card Association", New York, was used to designate the above said colors of the dyes).

Other arylides may be employed as the coupling component with which my new diazo components may be coupled, such as bis- and poly-arylides, e. g. 4.4'-(2.3-hydroxynaphthoylamino)-3.3'-dimethoxy-diphenyl, 1.3-(2.3-hydroxynaphthoyl amino) benzene, and di-(2.3-hydroxynaphthoylamino) naphthalene.

While cotton fibers have been mentioned in the example as the material to be dyed with the new azo dyes of my present invention, other natural or synthetic fibers may likewise be dyed therewith, e. g. wool, silk, rayon, and the like.

In brief, my invention concerns azo dyes produced by combining a diazo component having the general formula,

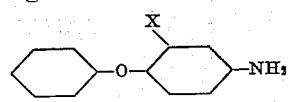

wherein X represents a halo group, and wherein the benzene nuclei may carry other substituent groups such as halo, alkyl, nitro, or ether groups, with an arylide of a hydroxynaphthoic acid, such arylide type being intended to include bis- and poly-arylides.

Other modes of applying the principle of my invention may be employed instead of the one explained, change being made as regards the steps or materials employed, provided the details stated by any of the following claims or the equivalent thereof be employed.

I therefore particularly point out and distinctly claim as my invention:—

1. The method of making an azo dye, which comprises coupling a diazotized 4-amino-2-halo-diphenyloxide with an arylide of a hydroxynaphthoic acid.
2. The method of making an azo dye, which comprises coupling a diazotized 4-amino-2-chloro-diphenyloxide with an arylide of a hydroxynaphthoic acid.
3. The method of making an azo dye, which comprises coupling a diazotized 4-amino-2-halo-diphenyloxide with an arylide of 2.3-hydroxynaphthoic acid.
4. The method of making an azo dye, which comprises coupling a diazotized 4-amino-2-chloro-diphenyloxide with an arylide of 2.3-hydroxynaphthoic acid.
5. The method of making an azo dye, which comprises coupling a diazotized 4-amino-2-chloro-diphenyloxide with a bis-arylide of 2.3-hydroxynaphthoic acid.
6. As a new compound, an azo dye prepared by coupling a 4-amino-2-halo-diphenyloxide with an arylide of a hydroxynaphthoic acid.
7. As a new compound, an azo dye prepared by coupling a 4-amino-2-chloro-diphenyloxide with an arylide of a hydroxynaphthoic acid.
8. As a new compound, an azo dye prepared by coupling a 4-amino-2-halo-diphenyloxide with an arylide of a 2.3-hydroxynaphthoic acid.
9. As a new compound, an azo dye prepared by coupling a 4-amino-2-chloro-diphenyloxide with an arylide of a 2.3-hydroxynaphthoic acid.
10. As a new compound, an azo dye prepared by coupling a 4-amino-2-chloro-diphenyloxide with a bis-arylide of a 2.3-hydroxynaphthoic acid.
11. As a new compound, an azo dye having the following formula,

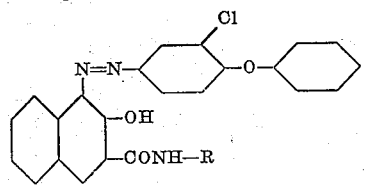

wherein R represents a residue of a primary aromatic amine.

12. As a new compound, an azo dye having the following formula,

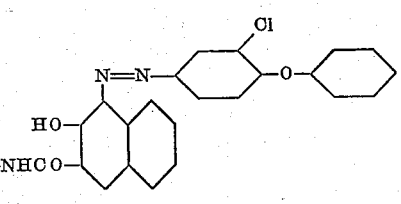

wherein R represents a residue of a primary aromatic diamine.

Signed by me this 12 day of January, 1931.

ERNEST F. GRETHER.